Feb. 1, 1949.  F. J. RAYBOULD  2,460,653
HOSE END
Filed April 20, 1946

INVENTOR.
FRANK J. RAYBOULD
BY Richey & Watts
ATTORNEYS

Patented Feb. 1, 1949

2,460,653

UNITED STATES PATENT OFFICE 2,460,653

HOSE END

Frank J. Raybould, Lakewood, Ohio, assignor to The Weatherhead Company, Cleveland, Ohio, a corporation of Ohio Application April 20, 1946, Serial No. 663,678

2 Claims. (Cl. 285—86)

1

This invention relates to a quick attachable type of fitting for use on flexible hoses. I am aware of the fact that the prior art discloses a number of quick attachable and detachable fittings adapted to receive a flexible hose which provides a fluid seal between the hose and the fitting. However, I have found that the fittings of the prior art are subject to certain disadvantages and, although it may be true that if those fittings were made relatively large to provide large sealing areas and surfaces a reasonably tight seal might be obtained, such an expedient is not desirable where considerations of weight and size are of importance.

It is an object of my invention to provide an excellent seal with a fitting having relatively small dimensions and being relatively light in weight as compared to fittings of equal effectiveness found in the prior art. Briefly, I accomplish this by provision of a novel type clamping ring and cooperating fitting parts whereby the hose is radially compressed to a relatively great degree at a portion somewhat spaced from its end and at the same time the hose end is urged towards an abutment wall in such a manner that the hose end is forced into sealing engagement with that wall, and in some cases the hose may be gathered into a space thereby provided to produce an unusually effective seal.

Those skilled in the art are aware of the fact that certain types of hoses have a tendency to cold flow, that is, although they may be clamped tightly over one area, they tend to flow towards an area wherein the clamping pressure is relatively less, this action taking place some time after the initial installation of the fitting. It is another object of my invention to trap or confine a portion of the hose in such a manner that it cannot cold flow and reduce the effectiveness of the seal. I accomplish this by providing a strong radial compression force on the hose which is some distance from the end thereof, thereby trapping the terminal portion of the hose against cold flow. It may also be pointed out that this trapping action accomplishes another desirable result in that any axial force on the hose tending to withdraw it from the fitting is resisted by a wedging engagement adjacent the terminal portion of the hose. These and other objects of my invention will become apparent as the following detailed description proceeds.

In the drawings:

Fig. 1 is a partially sectioned view of my improved fitting applied to a hose before the clamping nut is tightened;

2

Figure 1:
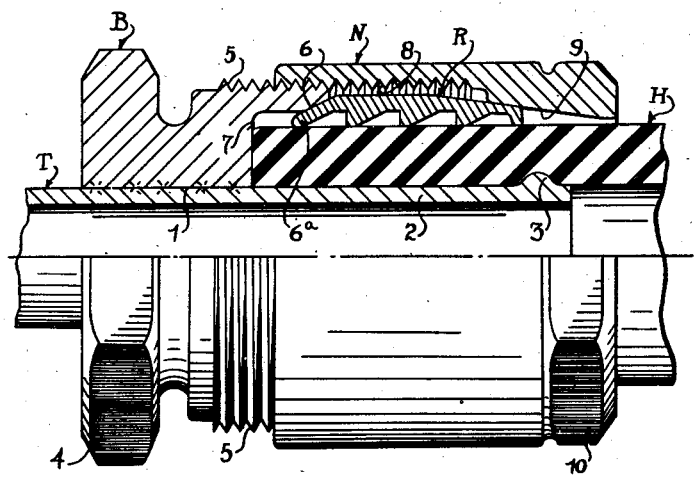

Referring now to the drawings, in Fig. 1 can be seen a metallic tube T to which is soldered or brazed, as at 1, a fitting body member B. Although a tube is shown extending past body member B, the portion which extends from that member could be any standard fitting part such as a male or female nipple in accordance with conventional practice. A special clamping ring R and a clamping nut N complete the basic parts of my new fitting. A hose insert portion 2 extends integrally from the body member B and it may terminate in an enlarged portion 3 if so desired, although such an enlarged portion is not required in order to produce an effective seal. Body portion B has a polygonal section 4 to receive a wrench and it has a sleeve portion which may be externally threaded as at 5. A terminal portion of the threaded sleeve 5 may be formed with an internally tapered surface 6. A radially extending abutment wall portion 7 is provided between the sleeve 5 and the hose insert 2.

Figure 2:
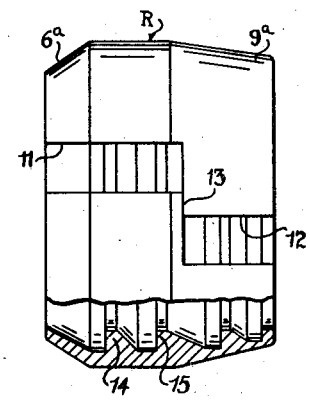
Fig. 2 is a partially sectioned view of my novel clamping ring.

The clamping ring R has formed externally thereon two tapered surfaces, the first tapered surface 6a being complementary to the tapered surface 6 which may be formed on the body member. This is also shown in Fig. 2. The second tapered surface 9a is formed on the ring R, this surface having a vertex angle appreciably smaller than that of surface 6a. It has been found in practice that a relatively shallow taper at this point is preferable, one in the nature of 5° or 10° giving satisfactory results. The ring R is split to permit its contraction, and the split may be staggered, having portions 11 and 12 offset with an aligning portion 13 formed therebetween to prevent axial displacement of the two sections. Internal hose gripping teeth 14 are provided and these may be formed so that they have forwardly facing hose gripping shoulders 15.

The nut N has threads 8 so that it may be threaded to a threaded portion 5 of body B. The nut also has an internal tapered surface 9 complementary to tapered surface 9a on ring R. Polygonal section 10 may be provided on the nut for reception of a wrench.

The method of assembling the fitting and the action obtained when the nut is tightened on the body portion will now be described. First, the hose end is forced over the hose insert 2 as far as it will go, best results being obtained if the hose can be advanced until its end abuts against abutment wall 7 of body B. After this, ring R, which has been previously slipped over the hose from one end, is initially brought into engagement with the body B as shown in Fig. 1. The nut N, which has likewise been previously slipped over the hose, is started on body B and is turned up until tapered portion 9 engages the complementary tapered portion on ring R, care being taken that the ring is in alignment with the hose and fitting. As the nut N is further tightened on the body member B with a wrench, two novel actions take place and, although these will be described consecutively for the sake of clarity, it is to be understood that they may occur simultaneously or substantially simultaneously, the final result being the same in any case.

Figure 3:
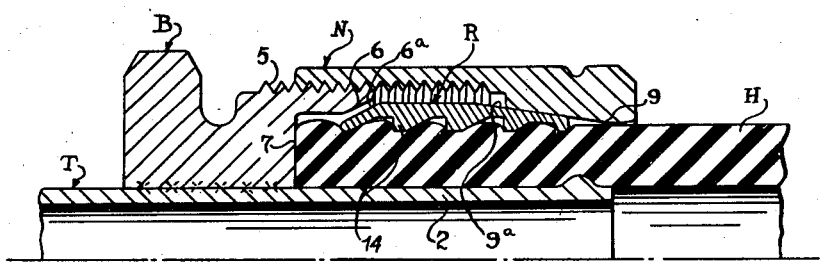
Fig. 3 illustrates one stage in the tightening of the fitting.
Figure 4:
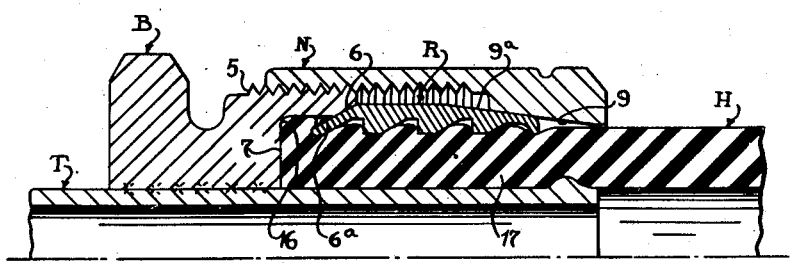
Fig. 4 illustrates a second stage in the setting up of the fitting.

The first of these actions to be described is illustrated in Fig. 3. As the nut is tightened, tapered surface 9 formed thereon slides over tapered surface 9a on ring R causing a powerful radial compression action adjacent that point, which compression tends to radially compress the hose around the insert 2. Of course, an axial force (to the left in the view) is also produced, but due to the shallow taper the initial tendency of the ring will be to compress radially. This action may cause the steeper tapered portion 6a of the ring to separate from the engaging surface 6 on member B. The radial compression continues until the resistance to that compression exceeds the resistance to axial motion of the ring and the hose material along the hose insert 2. At this point, as shown in Fig. 4, further tightening of the nut moves the ring R axially, (towards the left in the view) forcing the hose tightly against the abutment wall 7 on member B. This also tends to gather some of the hose as at 16 into the recess there provided. This action continues until taper 6a on the ring again engages its mating surface 6 on body B. Further tightening of the nut tends to augment the radial compression adjacent the shallow taper 9a, which action again is followed by a further forcing of the hose against the abutment 7.

These actions continue either alternately or simultaneously, until when the fitting is tight the hose is strongly compressed radially adjacent the area 17 and is firmly forced against the abutment wall 7 and gathered as at 16. This wedging action at 17 traps the end of the hose and prevents cold flow. Furthermore, any axial pull (to the right in Fig. 4) augments the seal due to the wedging entrapment of the hose. Lastly, the powerful axial force exerted against the hose which causes it to engage wall 7 and be gathered in as at 16, augments resistance to leakage of fluid past the parts.

Thus, those skilled in the art will appreciate that by provision of the novel tapered ring having a relatively steep taper and a relatively shallow taper, I have produced an unexpected and unusually effective seal without resorting to large heavy parts or to parts that depend upon deep biting and lacerating engagement with the hose material. It has been found that the taper 9a works satisfactorily when it is relatively shallow, in the nature of 5° or 10° for example, it being important that this taper is at all times more shallow than the taper 6 at the forward end of the ring.

I contemplate that certain modifications may be made without departing from the essence of my invention. As has been mentioned before, the body member B need not be brazed to a tube, it may be formed with a standard fitting or nipple portion. Likewise, nut N may have external threads for engagement with an internally threaded section of the body member B without modifying the operation of my novel clamping ring assembly. Furthermore, the tapered portion 6 of body member B need not be exactly complementary to portion 6a of the ring, a rounded or convex surface may be substituted therefor. However, I find it preferable to form tapers 9 and 9a substantially in complementary form.

The shape of the teeth in the ring is not critical, the form shown is one which is designed to provide a maximum advancement of the hose over the insert by reason of the forward facing abutments 15. However, satisfactory results will be obtained by the more conventional axially symmetrical ribs, and these may be substituted for the teeth shown if found desirable.

I have found that my fitting works particularly well when used with hose covered with wire braid. Such hose has always been difficult to seal and the ring shown is adapted to radially compress the hose and to gather into the fitting in a highly satisfactory manner. If the fitting were to be used with synthetic rubber, which is relatively soft, it may be that the teeth on the ring could be shallower to avoid undue laceration of the hose material. These and other modifications may be made without departing from the spirit of the invention as defined in the appended claims.

Having thus described the present invention so that others skilled in the art may be able to understand and practice the same, I state that what I desire to secure by Letters Patent is defined in what is claimed.

What I claim is:

1. A hose coupling comprising a body member including a hose insert portion, an axially extending sleeve portion surrounding a portion of said insert portion and radially spaced therefrom, and a hose abutment wall portion between said insert and sleeve portion, a split hose clamping ring formed with axially-spaced external tapered surfaces of different angularity, the steeper tapered surface being adapted to engage the sleeve portion of said body member, and a nut threaded to said body member having a surface engaging the shallower of said tapered surfaces on said clamping ring, the action of the fitting on a hose being one whereby as the nut is tightened the engagement between the nut and ring causes radial contraction of the ring and compression of the hose adjacent said engagement, against said insert, said tightening tending to separate the ring from its engagement with the body sleeve portion, resulting in an axially forward motion of said ring and adjacent hose portions relative to said body with an attendant gathering and forcing of the hose against said abutment wall.

2. A hose coupling comprising a body member including a hose insert portion, an axially extending sleeve portion surrounding a portion of said insert portion and radially spaced therefrom, and a hose abutment wall portion between said insert and sleeve portion, a split hose clamping ring having internal hose gripping projections and being formed with axially-spaced external tapered surfaces of different angularity, the steeper tapered surface being adapted to engage the sleeve portion of said body member, and a nut threaded to said body member having a surface engaging the shallower of said tapered surfaces on said clamping ring, the action of the fitting on a hose being one whereby as the nut is tightened the engagement between the nut and ring causes radial contraction of the ring and compression of the hose adjacent said engagement, against said insert, said tightening tending to separate the ring from its engagement with the body sleeve portion, resulting in an axially forward motion of said ring and adjacent hose portions relative to said body with an attendant gathering and forcing of the hose against said abutment wall.

FRANK J. RAYBOULD.

REFERENCES CITED

The following references are of record in the file of this patent:

UNITED STATES PATENTS

| Number | Name | Date |
| --- | --- | --- |
| 418,225 | Rice | Dec. 31, 1889 |
| 1,809,064 | Pearson | June 9, 1931 |
| 2,152,975 | Sanford | Apr. 4, 1939 |
| 2,188,006 | Katcher | Jan. 23, 1940 |
| 2,351,363 | Parker | June 13, 1944 |